INVENTORS
Fred M. Hayden
Robert W. Lewinski
By Smyth, Roston & Pavitt
Attorneys

INVENTORS
Fred M. Hayden
Robert W. Lewinski
By Smyth, Roston & Pavitt
Attorneys 3,450,933

LIGHT-ACTIVATED DEGAUSSING CIRCUIT

Fred M. Hayden, Sherman Oaks, and Robert W. Lewinski, Inglewood, Calif., assignors to Packard-Bell Electronics Corporation, Los Angeles, Calif., a corporation of California Filed Sept. 27, 1965, Ser. No. 490,298
Int. Cl. H01j 29/06
U.S. Cl. 315—8 1 Claim

ABSTRACT OF THE DISCLOSURE

This invention relates to television degaussing circuits for use in a television receiver wherein the receiver includes a source of constant amplitude alternating signal and wherein a degaussing coil is included in the receiver. The present invention includes a circuit for producing a decaying amplitude alternating signal from the constant amplitude alternating signal and includes a light-sensitive resistor in series between the constant amplitude alternating signal and the degaussing coil so that the resistance of the light-sensitive resistor controls the amplitude of the alternating signal through the degaussing coil. A light source is coupled to the light-sensitive resistor so that the light energy from the light source controls the resistance of the light-sensitive resistor and means are electrically coupled to the light source so as to control the production of the light energy from the light source. The light source may, therefore, be controlled so as to change its resistance from a high to a low value so as to allow a larger current to flow through the degaussing coil. When the light energy is removed, the resistance of the light-sensitive resistor decays so as to produce a decaying amplitude alternating signal to the degaussing coil.

Color television receivers, in particular, are sensitive to external or stray magnetic fields such as the earth's magnetic field. A color television receiver includes three electron guns arranged in a cluster to produce three electron beams. The electron beams are modulated in accordance with particular color information so that each electron beam represents an individual color. For example, a first electron beam is modulated with information to represent the red portion of the color signal; a second electron beam is modulated with information to represent the green portion of the color signal; and a third electron beam is modulated with information to represent the blue portion of the color signal.

The inner face of the color tube contains groups of three different types of phosphors with each type of phosphor designed to radiate light energy at a particular wave length. Specifically, the different types of phosphors radiate light energy at wave lengths representing the colors blue, green and red. The three electron beams are designed to strike particular ones of the phosphors on the inside face of the colored tube. Specifically, each one of the electron beams is designed to strike a particular one of the phosphors which radiates light energy equivalent to the color information contained in the beam. For example, the electron beam modulated by information representing the blue portion of the color signal strikes the phosphors which radiate blue light.

The particular spacial relationship between the electron beams and the different phosphors on the inner surface of the color tube are highly critical. In order to ensure that the different electron beams strike the proper ones of the phosphors on the inner face of the color tube, a shadow mask is interposed between the electron gun and the inner face of the color tube. The shadow mask includes a plurality of holes aligned with the groups of phosphors and the electron guns so that the electron beams pass through the holes to strike the proper ones of the phosphors within each group.

Stray magnetic fields within the color tube can produce unwanted deflections so that the electron beams may strike improper ones of the phosphors so as to disturb the correct color relationship on the face of the color tube. In particular, the earth's magnetic field may produce unwanted deflections in the color tube. A specific problem in the color tube is that the shadow mask can become magnetized by the earth's magnetic fields so as to produce unwanted deflection of the electron beams.

The problem of improper deflections of the electron beams within the color tube is magnified by moving the color receiver. When the color receiver is initially installed in the home, the service man degausses the entire color tube so that the deflection circuit within the color tube operates in a proper manner. The earth's magnetic field after the degaussing operation does not have a significant effect on the deflection circuit. When the color receiver is moved, however, the change in position of the receiver relative to the earth's magnetic field accumulates the effect of the magnetic fields within the color tube so as to produce unwanted deflections of the electron beams. The above problem due to the moving of the receiver is increasing since the newer color television receivers are lighter in weight and since some of the newer color television receivers are mounted on swivel bases so as to facilitate the positioning of the receiver with relation to the seating in the home. When the receiver is moved or swiveled the effect of the earth's magnetic field is increased so as to produce the unwanted deflections.

In the past, whenever the color receiver was moved it was necessary to summon a television service man to degauss the color receiver. This is obviously an expensive procedure, since it requires the service man to come to the home of the owner of the color television receiver. Moreover, the degaussing procedure was relatively cumbersome, since the degaussing coils had to be used in a particular manner so as to effectively degauss the color tube. Although the use of a service man to degauss the set was never a good solution it was a palatable solution, since in the past color receivers were relatively fixed at a location in the home. Since the newer color receivers may be mounted on swivel bases so as to facilitate their positioning and since the newer color receivers are smaller and lighter than the older color receivers, the owner of a color receiver is now more apt to move the color receiver than he would have in prior times.

In the prior art, degaussing coils have been built into the color receiver so as to eliminate the problem of calling a service man. The degaussing coils are placed around the color tubes and a decaying alternating signal is applied to the degaussing coils so as to produce a very low residual magnetism in the color tube.

One prior art method of degaussing is to degauss the color receiver each time the receiver is turned on by the user. The proper degaussing current is provided to the degaussing coils by placing a thermistor in parallel across the degaussing coils. An alternating signal, usually from the input line voltage, is applied to the parallel arrangement of the thermistor and the degaussing coils. Initially, the thermistor has a high resistance and most of the alternating current passes through the degaussing coils. As some current passes through the thermistor, the thermistor heats up and the resistance of the thermistor decreases in response to the current. The decreasing resistance of the thermistor allows more current to pass through the thermistor which in turn further lowers the resistance of the thermistor. This operation continues until the thermistor reaches its minimum resistance at which time almost all of the alternating current passes through the thermistor.

In the above manner a decreasing or decaying alternating signal is applied to the degaussing coils to demagnetize the color tube so that the color tube has a very small residual magnetism.

The above prior art type of degaussing system operates efficiently unless the color receiver is moved while the color receiver is turned on. For example, in a color receiver which sits on a swivel base the color receiver is designed to be moved while the receiver is turned on. When the receiver is moved it is again necessary to degauss the receiver and the only way this can be accomplished is to turn the color receiver off. Since thermistors are relatively slow-responding devices, the receiver must be off for a period of almost five minutes before the thermistor reaches its high resistance condition. At this time the receiver may then be turned on to provide the degaussing function in the color receiver. It can be seen that waiting five minutes in order to provide a degaussing in the color receiver after the receiver has been initially turned on would be annoying to the average set owner.

Another prior art method of degaussing the color tube is to energize the degaussing coils by using a separate switch arrangement which may be activated independently of the operation of the color receiver. For example, reference is made to application Ser. No. 363,940, filed Apr. 30, 1964, in the name of Harold F. Rietch and George O'Leary, and assigned to the same assignee as the instant application and to application, Ser. No. 436,731, filed on Mar. 3, 1965, in the name of Fred M. Hayden and assigned to the assignee of the instant case for degaussing systems using the above method. The above applications show the basic method and include particular circuits for producing the decaying alternating signals which are applied to the degaussing coil in order to demagnetize the color tube.

The use of independently controlled circuits for degaussing color receivers as shown in the above applications has been found to have certain deficiencies. First, the circuits are relatively expensive to manufacture in that they require relatively expensive components. In addition, the circuits may produce a high pulse during the first half cycle of the decaying alternating signal due to the inclusion of reactive components in the circuits. This high pulse is never completely overcome by the remaining portion of the decaying alternating signal and therefore a fairly high residual magnetism may be left in the color tube. This residual magnetism although not serious does disturb the purity of the color picture to some degree.

The present invention relates to a low-cost circuit which produces a decaying alternating signal for application to degaussing coils. In addition, the circuit of the present invention does not have a high pulse in its first half cycle so that the residual magnetism in the color tube after degaussing is always very low. The circuit of the present invention uses a light-responsive resistor in combination with a light source as a control device to produce the decaying alternating signal. The light-sensitive resistor may be either a CdS or CdSe photoconductive cell. Different embodiments of the degaussing circuit of the present invention are provided, to illustrate the different ways in which the principle of using a light-dependent resistor may be incorporated in the degaussing circuit. The invention will become clearer with reference to the drawings wherein:

Figure 3:
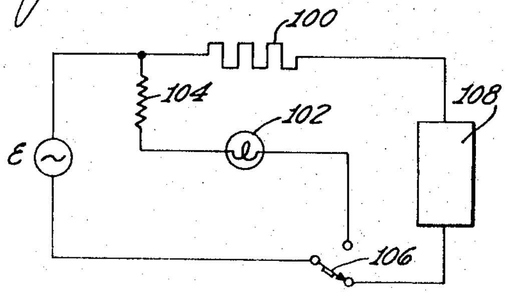
FIGURE 3 illustrates a first embodiment of a degaussing circuit using a light-dependent resistor as a control device.
Figure 3A:
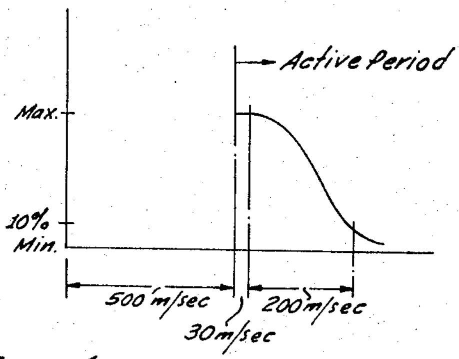
Figure 4:
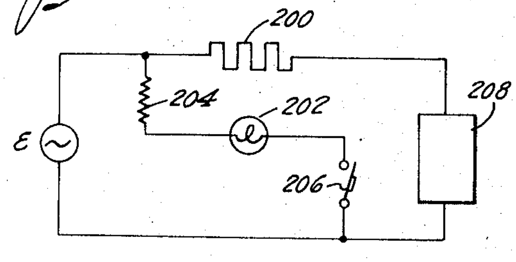
Figure 4A:
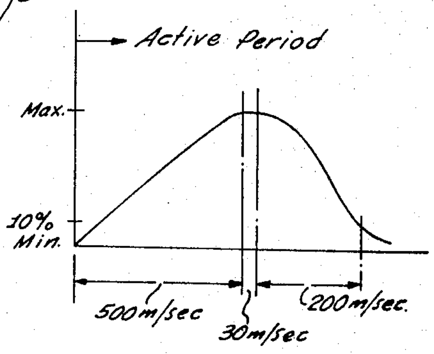
Figure 5:
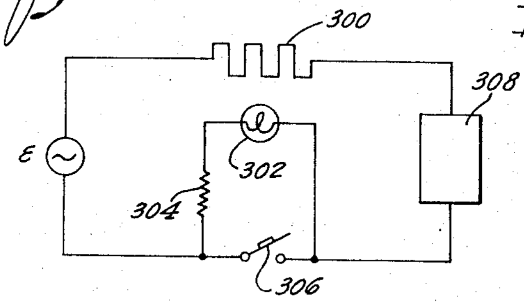
Figure 5A:
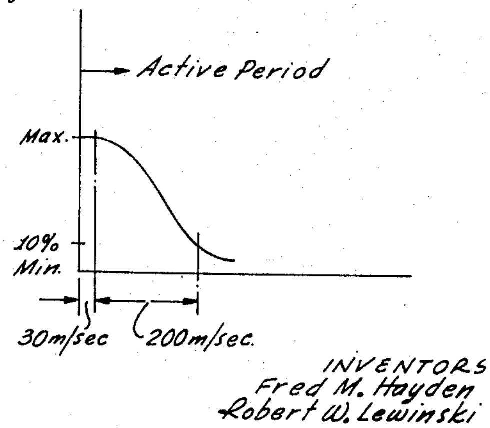

FIGURE 3*a* is a graph showing the average current through the light-dependent resistor of FIGURE 3;

FIGURE 4 is a second embodiment of a degaussing circuit using a light-dependent resistor as a control device;

FIGURE 4*a* is a graph showing the average current through the light-dependent resistor of FIGURE 4;

FIGURE 5 is a third embodiment of a degaussing circuit using a light-dependent resistor as a control device; and FIGURE 5*a* is a graph showing the average current through the light-dependent resistor of FIGURE 5.

Figure 1:
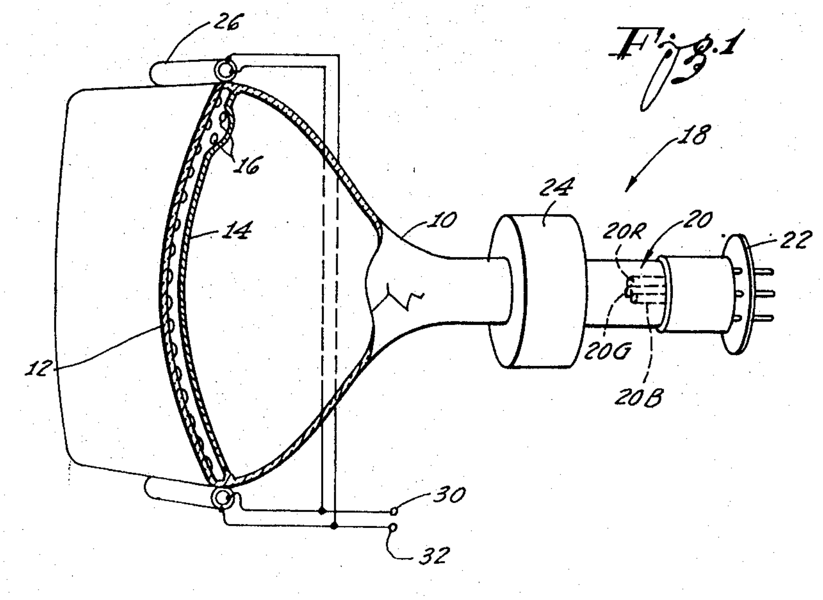
FIGURE 1 illustrates a general configuration of a color tube showing the location of degaussing coils.

FIGURE 1 illustrates the general configuration of a color television tube 10. The color television tube 10 includes a face 12. The face 12 may have a bonded glass outer surface so as to eliminate the need of a safety glass as with older color television tubes. The color tube 10 also includes a shadow mask 14 mounted within the color tube and behind the face 12 and having a plurality of holes 16. The color tube 10 also has a neck portion 18 which encloses a plurality of electron guns 20 referred to respectively as 20R, 20G and 20B. The letters R, G and B refer to the red, green and blue color information which is supplied to the three electron guns. The video information and electrical power is applied to the color tube 10 through an electrical plug 22. A deflection yoke 24 provides the proper horizontal and variable deflection of the electron beams produced by the electron guns 20. The color television tube 10 as shown in FIGURE 1 also has a pair of degaussing coils 26 and 28 mounted at the top and bottom portions of the color tube 10. The degaussing coils are electrically connected in parallel and have input terminals 30 and 32.

Figure 2:
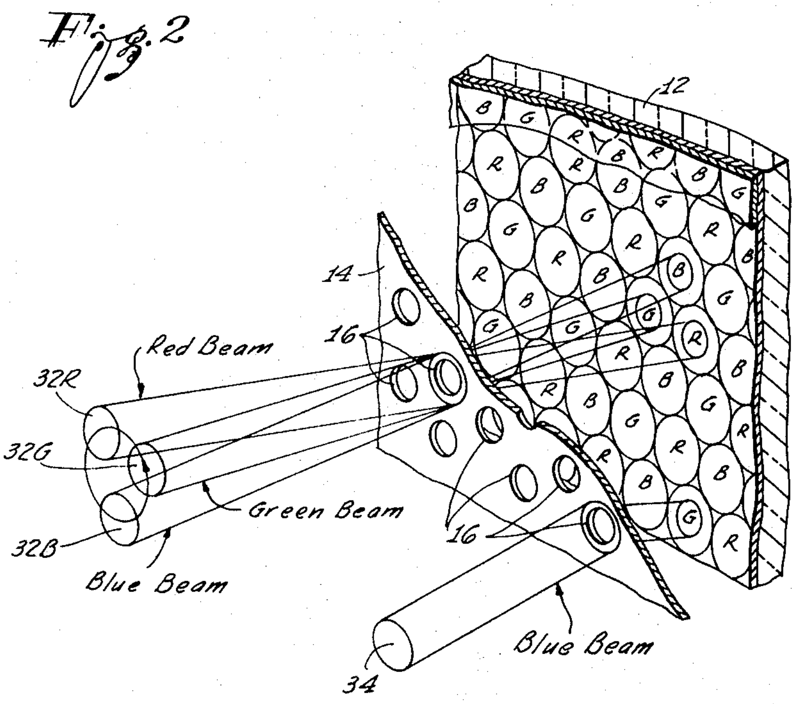
FIGURE 2 shows a large detailed view of the operation of the color tube illustrating the electron beams and the phosphors on the inner face of the color tube.

FIGURE 2 illustrates a detailed view of the inner surface of the face 12 and the shadow mask 14, showing the relationship of the shadow mask 14 to the phosphors when electron beams are directed toward the inner face of the color tube 10. The inner face of the tube 12 is covered with a plurality of individual phosphors, with the phosphors arranged in groups of red. green and blue phosphors. The individual electron beams modulated by the red, green and blue color information are designated by symbols 32R, 32G and 32B. When everything is in order in the color tube the electron beams 32R, 32G and 32B pass through one of the holes 16 in the shadow mask 14 so as to strike the proper ones of the phosphors. An electron beam 34 modulated by the blue portion of the information also passes through one of the openings 16 in the shadow mask 14. When the shadow mask 14 or some other element in the color tube has been sufficiently magnetized, the electron beam 34 may be improperly deflected so as to strike, for example, green phosphor instead of a blue phosphor. This would obviously destroy the color purity on the face of the color tube and would produce an improper picture.

FIGURE 3 shows a first embodiment of a circuit for producing a decaying alternating signal through the degaussing coils 26 and 28 of FIGURE 1 so as to reduce the residual magnetism within the color tube to a low value. In FIGURE 3 a source of alternating voltage is designated E. This source of alternating voltage may be, for example, the line voltage. The circuit of FIGURE 3 includes a light-dependent resistor 100, a light source 102, a current limiting resistor 104, a pushbutton switch 106, and a load 108 which represents the degaussing coils. As can be seen in FIGURE 3, the light-dependent resistor 100 is in series with the load 108, and the light source 102 and current limiting resistor 104 are in parallel across the source of alternating voltage E. The pushbutton switch 106 is shown in its normal position. The light-dependent resistor 100 may be a photoconductive cell such as a cadmium sulphide cell or a cadmium selenium cell, both of which are responsive to light energy so as to have a decreasing resistance with increasing light energy.

FIGURE 3A shows the average current through the light-sensitive resistor 100 during the operation of the degaussing circuit. When the pushbutton switch 106 is activated to its "On" position, current flows from the source of alternating voltage E through the light source 102 and the current limiting resistor 104. The light source 102 therefore produces light energy. The light energy produced by the light source 102 impinges on the light-dependent resistor 100 to reduce the resistance of the light-dependent resistor 100. It takes the light-dependent resistor 100 approximately ½ second or 500 milliseconds in order for the resistor 100 to reach its minimum resistance.

The pushbutton switch 106 is designed to be biased in the position shown in FIGURE 3. It should be noted, however, that in closing the pushbutton switch, the normal reaction time will maintain the switch 106 in a depressed position for at least ½ second. The pressure on the switch 106 is removed by the operator of the color receiver and the switch 106 returns to its normal position shown in FIGURE 3. When the switch 106 returns to its normal position, current is removed from the light source 102 and the light extinguishes. The light-dependent resistor, however, still has a low resistance value while in the series circuit with the degaussing coils. The light-dependent resistor 100 has a delay time before the resistance of the light-dependent resistor starts to increase due to the absence of light energy. This delay is shown in FIGURE 3*a* as the 30 millisecond period of high current passing through the resistor 100. The resistance of the light-dependent resistor 100 then proceeds to increase thereby producing a decaying current characteristic as shown in FIGURE 3*a*. In approximately 200 milliseconds the current has decreased to approximately 10% of its maximum value. As can be seen in FIGURE 3*a*, the average current through the light-sensitive resistor 100 has a decaying characteristic.

The active period shown in FIGURE 3*a* represents the time that current flows through the light-dependent resistor 100 and the degaussing coils. It is to be appreciated that the circuit of FIGURE 3 has some minimum current flowing through the degaussing coils at all times, but the dark resistance of the light-dependent resistor 100 is sufficiently high so as to prevent the minimum current from being of any significant value.

FIGURE 4 illustrates a second embodiment of a circuit for producing a decaying alternating signal. A source of alternating voltage is represented by the symbol E. In FIGURE 4 the circuit includes a light-sensitive resistor 200, a light source 202, a current limiting resistor 204, a pushbutton switch 206, and a load 208 representing the degaussing coils. In FIGURE 4 no current flows through the light source 202 when the pushbutton switch 206 is in the normal position. Before the pushbutton switch 206 is closed the current flowing in the light-sensitive resistor is relatively low, since at that time the light-dependent resistor has a high resistance.

When theh pushbutton switch 206 is closed, current flows through the light source 202 to produce light energy to decrease the resistance of the light-dependent resistor 200. The alternating current through the light-dependent resistor 200 therefore builds up until the minimum resistance point is obtained, which takes approximately 500 milliseconds as shown in FIGURE 4*a*. When the pressure on the switch 206 is removed, the light source 202 is extinguished and the resistance of the light-dependent resistor 200 increases. The current through the light-dependent resistor 200 and the degaussing coils therefore decays as the resistance of the light-dependent resistor increases.

The degaussing circuit of FIGURE 4 has an active period as shown in FIGURE 4*a* with the current both increasing and decreasing through the light-dependent resistor 200. The alternating current flowing through the degaussing coils shown by the load 208 therefore increases and decreases so as to have a complete cycling of the alternating current through the degaussing coils.

In FIGURE 5 a third embodiment of a circuit for producing a decaying alternating signal is shown and includes a source of alternating current E, a light-sensitive resistor 300, a light source 302, a current limiting resistor 304, a pushbutton switch 306 and a load 308 representing the degaussing coils. In FIGURE 5 the normal position of the switch 306 allows a current to flow through the light source 302. This current produces light energy through the light source so that resistor 300 is normally at a low resistance value. However, the resistance 304 is sufficient to keep the normal current flowing ing through the load 308 at a low value.

The light source 302 is a type such as a gas tube which operates at a low current. When the pushbutton switch 306 is activated, the light source 302 is extinguished, since the light source 302 is shorted out through the switch 306. The resistance of the light-dependent resistor 300 therefore increases due to the absence of light energy and the current through the light-sensitive resistor is as shown in FIGURE 5*a*. The degaussing circuit of FIGURE 5 therefore has an instantaneous response to the pushbutton 306 and the circuit can therefore be considered to be in a ready position until the pushbutton 306 is activated.

The various embodiments of the degaussing circuit of the present invention shown are all relatively inexpensive to manufacture. Both the light-sensitive resistor and the light source are low cost items. The various embodiments of the degaussing circuit of the present invention also does not produce a high pulse during the first half cycle since the degaussing circuit of the present invention does not include any reactive components.

It is to be appreciated that the combination of a light source and a light-dependent resistor as a control device for producing a decaying alternating signal for application to a degaussing coil may be arranged in many configurations. The particular embodiments shown are illustrative only and the invention may have various adaptations and modifications. The invention, therefore, is only to be limited by the appended claim.

We claim:

1. A degaussing circuit including,
a degaussing coil having first and second terminals,
a source of constant amplitude alternating current having first and second terminals,
a light-sensitive resistor in series between the first terminal of the source of constant amplitude alternating current and the first terminal of the degaussing coil to have the resistance of the light-sensitive resistor control the amplitude of the alternating current passing through the degaussing coil,
a source of light energy connected to the first terminal of the source of constant amplitude current and having the source of light energy direct light energy toward the light-sensitive resistor to control the resistance of the light-sensitive resistor, and
a pushbutton switch having a common terminal connected to the second terminal of the source of constant amplitude alternating current and having a first normally on terminal connected to the second terminal of the degaussing coil, and a second normally off terminal connected to the source of light energy.

References Cited

UNITED STATES PATENTS

| | | | |
|---|---|---|---|
| 2,943,205 | 6/1960 | Kazan | 250—206 |
| 3,151,280 | 9/1964 | Naylor | 250—206 |

ROBERT SEGAL, *Primary Examiner.*

U.S. Cl. X.R.

250—206